(12) United States Patent
Grinshpun et al.

(10) Patent No.: US 9,794,825 B2
(45) Date of Patent: Oct. 17, 2017

(54) SYSTEM AND METHOD FOR DETERMINING CELL CONGESTION LEVEL

(71) Applicants: Edward Grinshpun, Freehold, NJ (US); Charles Payette, Oceanport, NJ (US); Bruce Cilli, Atlantic-Highlands, NJ (US); Sameer Sharma, Holmdel, NJ (US); Harish Viswanathan, Morristown, NJ (US)

(72) Inventors: Edward Grinshpun, Freehold, NJ (US); Charles Payette, Oceanport, NJ (US); Bruce Cilli, Atlantic-Highlands, NJ (US); Sameer Sharma, Holmdel, NJ (US); Harish Viswanathan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 197 days.

(21) Appl. No.: 14/534,968

(22) Filed: Nov. 6, 2014

(65) Prior Publication Data

US 2016/0135076 A1    May 12, 2016

(51) Int. Cl.
*H04W 28/02* (2009.01)
*H04L 12/825* (2013.01)

(52) U.S. Cl.
CPC ....... *H04W 28/0284* (2013.01); *H04L 47/263* (2013.01); *H04W 28/0257* (2013.01)

(58) Field of Classification Search
CPC .......... H04W 28/0284; H04W 28/0257; H04L 47/263
See application file for complete search history.

(56) References Cited

U.S. PATENT DOCUMENTS

| | | |
|---|---|---|
| 2009/0110087 A1 | 4/2009 | Liu et al. |
| 2010/0056163 A1 | 3/2010 | Schmidt et al. |
| 2010/0234031 A1 | 9/2010 | Lidron |
| 2010/0290394 A1 | 11/2010 | Noldus |
| 2011/0039562 A1 | 2/2011 | Balasubramanian et al. |
| 2012/0315935 A1 | 12/2012 | Wang Helmersson et al. |
| 2013/0100806 A1* | 4/2013 | Wang ............... H04L 47/20 370/232 |
| 2014/0357300 A1 | 12/2014 | Hao et al. |
| 2015/0195746 A1 | 7/2015 | Franklin et al. |
| 2015/0278245 A1 | 10/2015 | Sagar et al. |

(Continued)

OTHER PUBLICATIONS

3GPP TR 23.705V0.2.0 (realease 12), Feb. 2013.*

(Continued)

*Primary Examiner* — Alex Skripnikov
*Assistant Examiner* — Pamit Kaur
(74) *Attorney, Agent, or Firm* — Harness, Dickey & Pierce, P.L.C.

(57) ABSTRACT

A metric of cell congestion is determined using an average physical resource block rate that is expected to be allocated for a very active user equipment bearer that is a persistent average rate. The average physical resource block rate is mapped to congestion levels and this information is exported to an application function or a radio access network function in order to mitigate congestion. An average bearer throughput for the user equipment can be calculated based on the average physical resource block rate.

28 Claims, 10 Drawing Sheets

(56) References Cited

U.S. PATENT DOCUMENTS

2015/0365829 A1 12/2015 Grayson et al.
2016/0227385 A1 8/2016 Ahmad et al.

OTHER PUBLICATIONS

Office Action from corresponding U.S. Appl. No. 14/750,844, dated Jan. 9, 2017.
LTE Advanced. 3GPP, 3GPP TS 23.303, v. 12.2.0 (Sep. 2014), "Policy and Charing Control Architecture."
3GPP, "3GPP TS36.213 tables 7.1.7.1-1 and 7.1.7.2.1." vo.1.0. (Oct. 2006).
LTE Advanced, "3GPP TR 23.705." vo.2.0 (Feb. 2013).

* cited by examiner

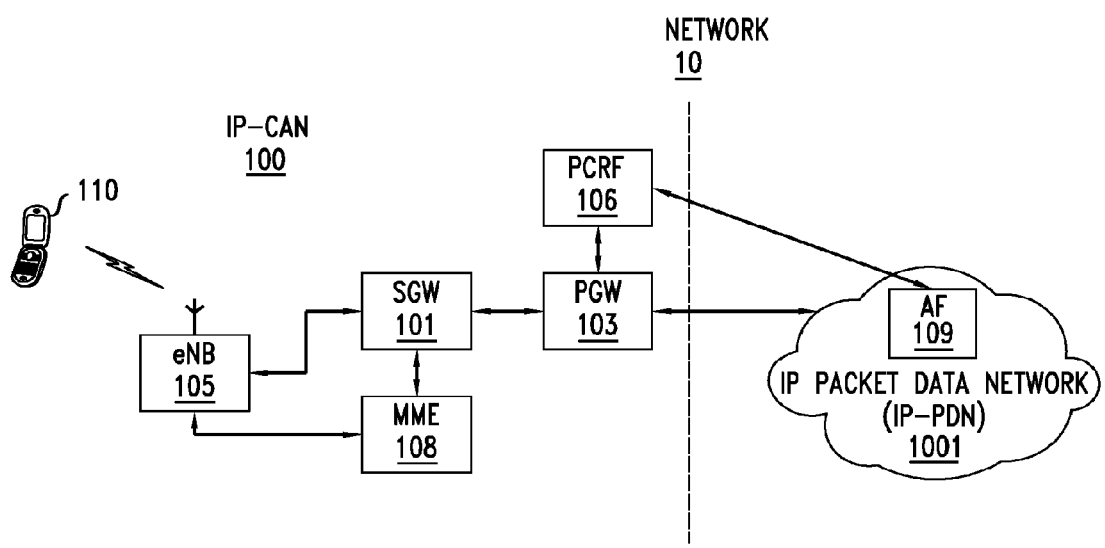
*FIG. 1*
(CONVENTIONAL)

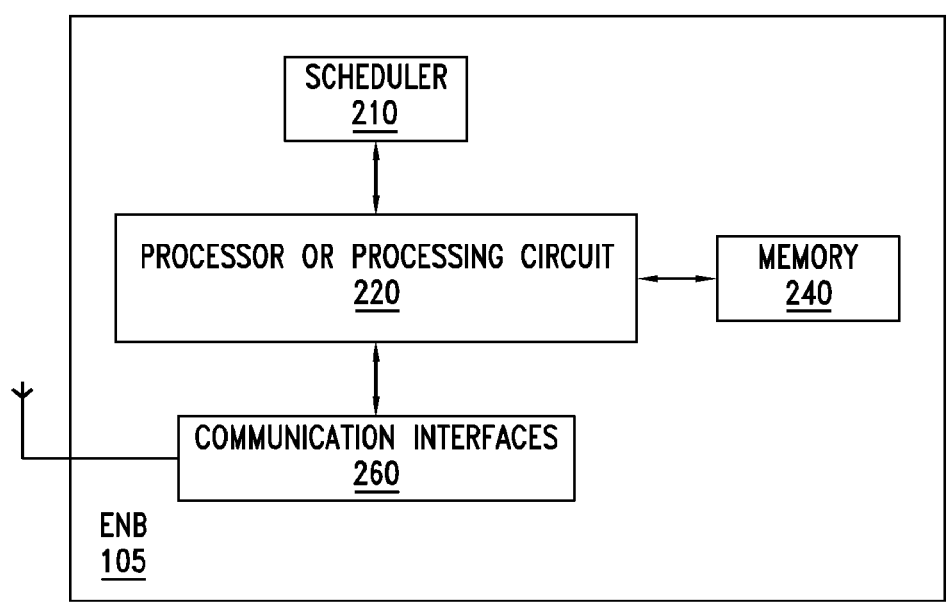
*FIG. 2*
(CONVENTIONAL)

BEST EFFORT QCI 9
CONGESTION LEVEL

QCI 7
CONGESTION LEVEL

GBR QCI 2
CONGESTION LEVEL

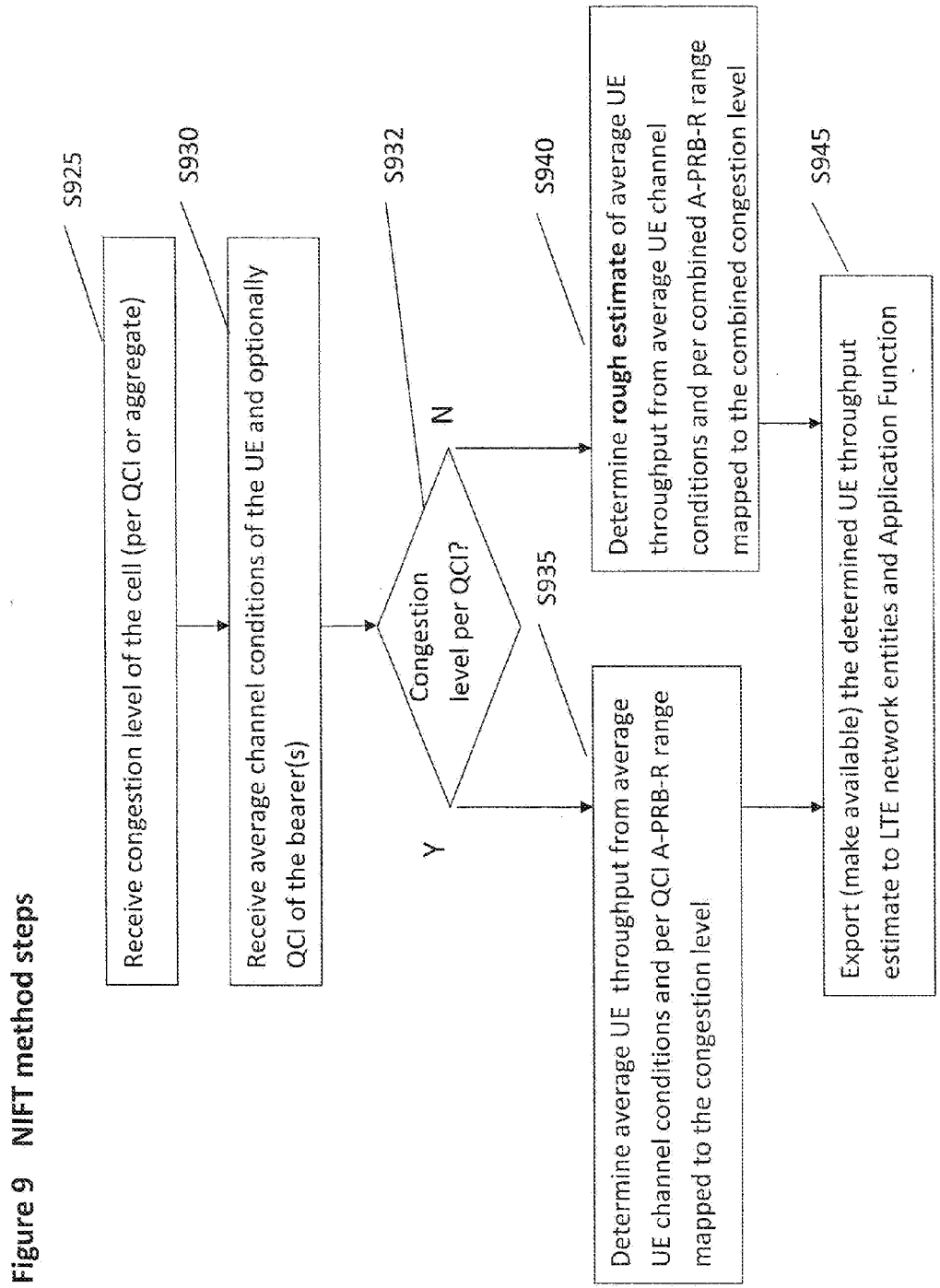
Figure 9 NIFT method steps

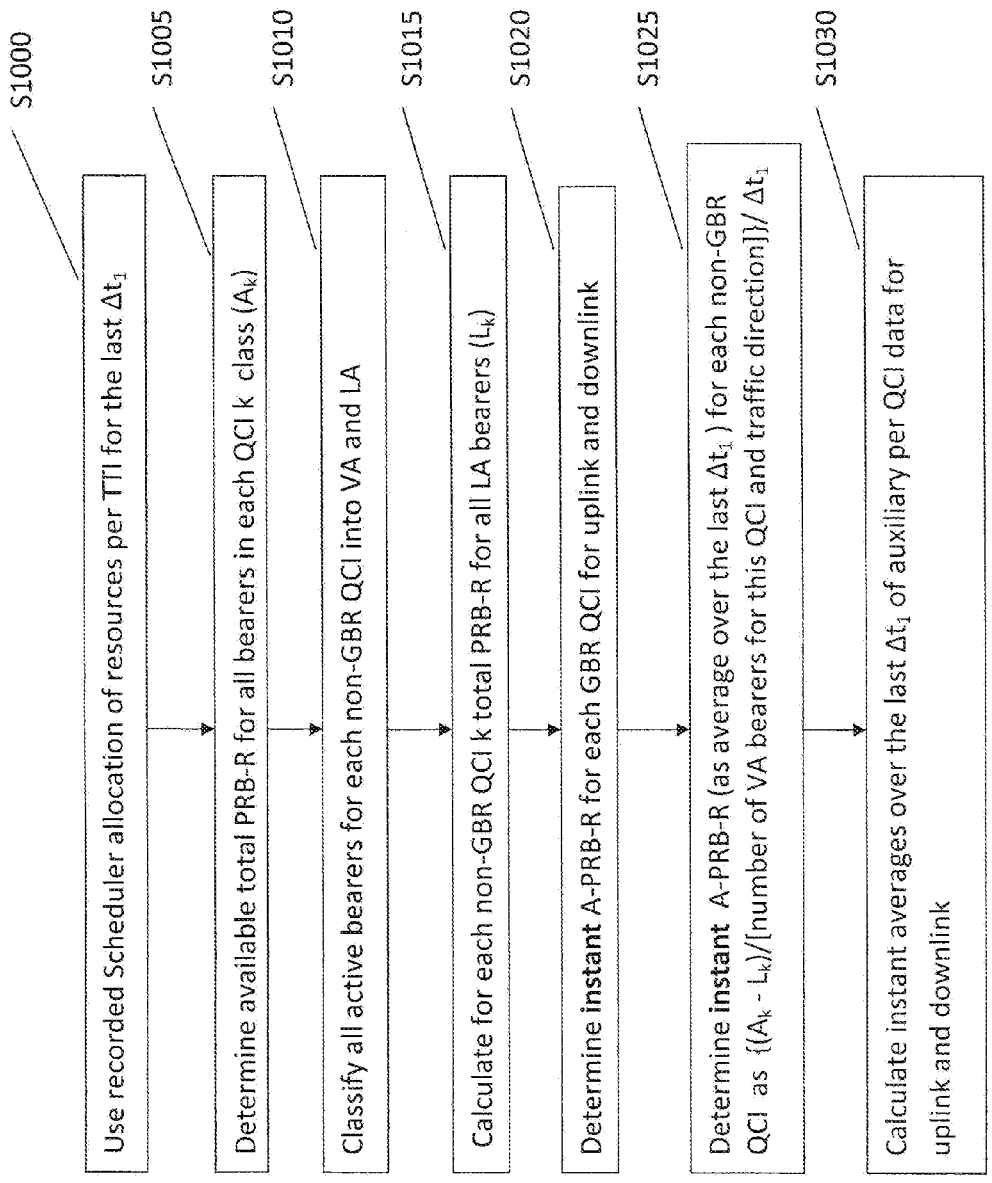
Figure 10. NIF Agent method steps

SYSTEM AND METHOD FOR DETERMINING CELL CONGESTION LEVEL

BACKGROUND OF THE INVENTION

Field of the Invention

Example embodiments relate generally to a system and method for determining cell congestion using an average physical resource block rate.

Related Art

FIG. 1 is a conventional network 10 with mobile User Equipment (UE) 110 connected to the Internet Protocol (IP) Packet Data Network (IP-PDN) 1001 (also referred to as internet) wirelessly via 3$^{rd}$ Generation Partnership Project Long-Term Evolution (3GPP LTE) IP Connectivity Network (IP-CAN) 100 (also referred to as a wireless network). The IP-CAN 100 generally includes: a serving gateway (SGW) 101; a packet data network (PDN) gateway (PGW) 103; a policy and charging rules function (PCRF) 106; a mobility management entity (MME) 108, and an Evolved Node B (eNB) 105 (also referred to as cell). The IP-PDN 1001 includes Application Function (AF) 109 which may include application or proxy servers, media servers, email servers, other connected UEs, etc.

Within the IP-CAN 100, the eNB 105 is part of what is referred to as an Evolved Universal Mobile Telecommunications System (UMTS) Terrestrial Radio Access Network (EUTRAN), and the portion of the IP-CAN 100 including the SGW 101, the PGW 103, and the MME 108 is referred to as an Evolved Packet Core (EPC). Although only a single eNB 105 is shown in FIG. 1, it should be understood that the EUTRAN may include any number of eNBs. Similarly, although only a single SGW, PGW and MME are shown in FIG. 1, it should be understood that the EPC may include any number of these core network elements.

The eNB 105 provides wireless resources and radio coverage for UEs including UE 110. For the purpose of clarity, only one UE is illustrated in FIG. 1. However, any number of UEs may be connected (or attached) to the eNB 105. The eNB 105 is operatively coupled to the SGW 101 and the MME 108.

The SGW 101 routes and forwards user data packets, while also acting as the mobility anchor for the user plane during inter-eNB handovers of UEs. The SGW 101 also acts as the anchor for mobility between 3$^{rd}$ Generation Partnership Project Long-Term Evolution (3GPP LTE) and other 3GPP technologies. For idle UEs, the SGW 101 terminates the downlink data path and triggers paging when downlink data arrives for UEs.

The PGW 103 provides connectivity between the UE 110 and the external packet data networks (e.g., the IP-PDN) by being the point of entry/exit of traffic for the UE 110. As is known, a given UE may have simultaneous connectivity with more than one PGW for accessing multiple PDNs.

The PGW 103 also performs policy enforcement, packet filtering for UEs, charging support, lawful interception and packet screening, each of which are well-known functions. The PGW 103 also acts as the anchor for mobility between 3GPP and non-3GPP technologies, such as Worldwide Interoperability for Microwave Access (WiMAX) and 3$^{rd}$ Generation Partnership Project 2 (3GPP2 (code division multiple access (CDMA) 1× and Enhanced Voice Data Optimized (EvDO)).

Still referring to FIG. 1, the eNB 105 is also operatively coupled to the MME 108. The MME 108 is the control-node for the EUTRAN, and is responsible for idle mode UE paging and tagging procedures including retransmissions.

The MME 108 is also responsible for choosing a particular SGW for a UE during initial attachment of the UE to the network, and during intra-LTE handover involving Core Network (CN) node relocation. The MME 108 authenticates UEs by interacting with a Home Subscriber Server (HSS), which is not shown in FIG. 1.

Non Access Stratum (NAS) signaling terminates at the MME 108, and is responsible for generation and allocation of temporary identities for UEs. The MME 108 also checks the authorization of a UE to camp on a service provider's Public Land Mobile Network (PLMN), and enforces UE roaming restrictions. The MME 108 is the termination point in the network for ciphering/integrity protection for NAS signaling, and handles security key management.

The MME 108 also provides control plane functionality for mobility between LTE and 2G/3G access networks with the S3 interface from the SGSN (not shown) terminating at the MME 108.

The Policy and Charging Rules Function (PCRF) 106 is the entity that makes policy decisions and sets charging rules. It has access to subscriber databases and plays a role in the 3GPP architecture as specified in 3GPP TS 23.303 "Policy and Charging Control Architecture". In particular PCRF via PGW may configure wireless bearers, and PCRF also may configure policies on PGW and SGW related to flow control of the packets that belong to a particular bearer.

UE 110 communicates with the Application Function (AF) 109 via IP-CAN 100 to establish application session, receive and send application content and other application specific information. AF 109 may be a server in IP-PDN, or a peer end user device or a combination of these. AF 109 may register with PCRF 106 to receive application level policy that may enable adapting application behavior to help improve end user quality of experience.

FIG. 2 is a diagram of a conventional E-UTRAN Node B (eNB) 105. The eNB 105 includes: a memory 240; a processor 220; a scheduler 210; and communication interfaces 260. The processor 220 may also be referred to as a core network entity processing circuit, an EPC entity processing circuit, etc. The processor 220 controls the function of eNB 105 (as described herein), and is operatively coupled to the memory 240 and the communication interfaces 260.

The eNB may include one or more cells or sectors serving UEs within individual geometric coverage sector areas. Each cell individually may contain elements depicted in FIG. 2. Throughout this document the terms eNB, cell or sector shall be used interchangeably.

Still referring to FIG. 2, the communication interfaces 260 include various interfaces including one or more transmitters/receivers connected to one or more antennas to transmit/receive (wireline and/or wirelessly) control and data signals to/from UEs or via a control plane or interface to other EPC network elements and/or RAN elements. The scheduler 210 schedules control and data communications that are to be transmitted and received by the eNB 105 to and from UEs 110. The memory 240 may buffer and store data that is being transmitted and received to and from eNB 105.

Every Transmission Time Interval (m), typically equal to 1 millisecond, the scheduler may allocate a certain number of Physical Resource Blocks (PRBs) to different bearers carrying data over the wireless link in the Downlink (from eNB 105 to UE 110) and Uplink (from UE 110 to eNB 105) directions. The scheduler may also determine Modulation and Coding Schema (MCS) that may define how many bits of information may be packed into the allocated number of PRBs. The latter is defined by the 3GPP TS36.213 tables 7.1.7.1-1 and 7.1.7.2.1-1, which presents a lookup table for a number of bits of data that may be included in PRBs sent per TTI for a given allocated number of PRBs and a MCS value. MCS is computed by the scheduler using Channel Quality Indicator (CQI) values reported by the UE 110 that in turn may be derived from measured by the UE 110 wireless channel conditions in the form of Signal to Interference and Noise Ratio (SINR).

Scheduler 210 may make PRB allocation decisions based upon a Quality of Service (QoS) Class Identifier (QCI), which represents traffic priority hierarchy. There are nine QCI classes currently defined in LTE, with 1 representing highest priority and 9 representing the lowest priority. QCIs 1 to 4 are reserved for Guaranteed Bitrate (GBR) classes for which the scheduler maintains certain specific data flow QoS characteristics. QCIs 5 to 9 are reserved for various categories of Best Effort traffic.

While the scheduler operations are not standardized, there are certain generic types of schedulers that are generally accepted. Examples include strict priority scheduler (SPS) and proportional weighted fair share scheduler (PWFSS). Both types try to honor GBR needs first by allocating dedicated resources to meet whenever possible the GBR bearer throughput constraints while leaving enough resources to maintain certain minimal data traffic for non-GBR classes. The SPS allocates higher priority classes with all the resources that may be needed (except for a certain minimal amount of resources to avoid starving lower priority classes), and lower priority classes generally receive the remaining resources. The PWFSS gives each non-GBR QCI class certain weighted share of resources, that may not be exceeded unless unutilized resources are available.

Radio access network (RAN) congestion detection and congestion level determination is critical in order to optimize the network 10 performance of applications. Conventionally, there is not standardized definition of congestion that allows for a simple and measurable way to determine network congestion levels. While $3^{rd}$ Generation Partnership Project Long-Term Evolution (3GPP LTE) standards currently define various means of reporting RAN congestion levels (see 3GPP TR 23.705 in particular), the definition and computation of "congestion" remains undefined.

Conventional characteristics of cell congestion are often defined in terms of user equipment (UE) throughput, a number of UEs being served, or a percentage of cell load being monopolized/used. However, these measures of cell congestion are inadequate, for some of the reasons described in detail herein.

First, characterization of cell congestion in terms of UE throughput is inadequate because UE throughput in wireless networks is also dependent upon channel conditions of the UE. Cell congestion level describes the state of the available cell resources and therefore should not be dependent upon channel conditions of individual UEs, as movement of UEs may abruptly change the channel conditions.

Second, characterization of congestion level in terms of a number of active UEs being served is an inadequate measure, because many UEs may be passing very light traffic, these UEs with very light traffic will have no significant impact on an amount of throughput that may be available for a UE joining a cell which may have much heavier demands. For this reason, a number of active UEs being served is also not an effective good measure of cell congestion level.

Third, characterization of congestion level in terms of a percentage of cell load being used is inadequate. This is because, in LTE for instance, one or two users may fully load the cell because of a large amount of traffic that these small group of users may be monopolizing due to, for example, downloading or uploading of large files. Because this measure of congestion may be skewed to appear that the network is congested based on the demands of a small group of users, a percentage of cell load being used is also not a good measure of congestion.

In addition to the conventional problems associated with defining congestion, an amount of traffic that a single UE may receive also depends upon the type of application the UE may be using. The definition of cell congestion level should not be dependent upon the application that is being used, but rather the definition should be determined by the availability of cell resources. For example, if a UE is running an application on a best efforts basis, the UE may usurp close to 100% of downlink cell capacity for ftp downloads. However, such network use should not accurately be considered "congested." This is because, if another UE joins the network and runs an application on a best efforts basis for ftp downloads, this additional user may receive approximately 50% of cell resources due to fairness scheduling by an E-UTRAN Node B (eNodeB), as the network has ample capacity to serve both UE.

Because existing definitions of congestion are ambiguous, standards often times describe what congestion is not, as opposed to what congestion is, and these standards do not describe any specific methods for estimating network congestion level. For example, 3GPP Technical Report (TR) 23.705 includes a study on system enhancements for user plane congestion management indicating that RAN user plane congestion occurs when demand for RAN resources exceeds the available RAN capacity to deliver the user data for a period of time, and congestion leads, for example, to packet drops or delays, and may or may not result in degraded end-user experience. The 3GPP TR further explains that short-duration traffic bursts is a normal condition at any traffic load level, and is not considered to be RAN user plane congestion. Likewise, a high-level of utilization of RAN resources (based on operator configuration) is considered a normal mode of operation and might not be RAN user plane congestion. And, RAN user plane congestion includes user plane congestion that occurs over the air interface (e.g. LTE-Uu), in the radio node (e.g. eNB) and/or over the backhaul interface between RAN and CN (e.g. S1-u).

3GPP TR 23.705 also indicates that a user-impact to congestion occurs when a service that is delivered to a UE over a default bearer or a dedicated bearer does not meet the user's expected service experience due to RAN user plane congestion. The expectation for a service delivery is highly dependent on the particular service or application. The expected service experience may also differ between subscriber groups (e.g., a premium subscriber may have higher expectations than a subscriber with the cheapest subscription). RAN resource shortage where the RAN can still fulfill the user expectations for a service delivery is not considered to be user-impacting congestion; rather, it is an indication for full RAN resource utilization, and as such a normal mode of operation. 3GPP TR 23.705 therefore notes that "It is up to the operator to determine when a service satisfies the user's expected service experience."

SUMMARY OF INVENTION

Example embodiments provide a system and method for determining cell congestion using an average physical resource block rate that may be expected to be allocated for a very active user equipment bearer that may be a persistent average rate. The average physical resource block rate may be mapped to congestion levels and this information may be exported to an application function or a radio access network function in order to mitigate congestion. An average bearer throughput for the user equipment may also be calculated based on the average physical resource block rate.

In one embodiment, a method of determining cell congestion may comprise: determining, by one or more processors of at least one network node, an average physical resource block rate to be allocated by a scheduler for very active bearers of a particular quality of service level and traffic direction, the very active bearers being bearers that continuously attempt to obtain a maximal fair share of physical resource blocks that are available by the scheduler for a given duration of time; mapping, by the one or more processors, the average rate of physical resource blocks to congestion levels to produce congestion level information; and exporting, by the one or more processors, the congestion level information.

In one embodiment, a method of determining average available wireless network throughput for a user equipment (UE) bearer of a wireless Internet Protocol Connectivity Access Network (IP-CAN), may comprise: receiving, by one or more first processors of a first node, an average physical resource block rate in the form of cell congestion level information for a cell from a second node, the second node being part of the IP-CAN; receiving, by the one or more first processors, average channel condition information for at least one UE served by the cell; calculating, by the one or more first processors, an average bearer throughput for the UE based on the average physical resource block rate and the average channel condition information; and exporting, by the one or more processors, the average bearer throughput for the UE.

In one embodiment, at least one network node, may comprise: one or more a processors configured to, determine an average physical resource block rate to be allocated by a scheduler for very active bearers of a particular quality of service level and traffic direction, the very active bearers being bearers that continuously attempt to obtain a maximal fair share of physical resource blocks that are available by the scheduler for a given duration of time; map the average rate of physical resource blocks to congestion levels to produce congestion level information; and export the congestion level information.

In one embodiment, a first node, may comprise: one or more processors configured to, receive an average physical resource block rate in the form of cell congestion level information for a cell from a second node, the second node being part of the IP-CAN; receive average channel condition information for at least one UE served by the cell; calculate an average bearer throughput for the UE based on the average physical resource block rate and the average channel condition information; and export the average bearer throughput for the UE.

BRIEF DESCRIPTION OF THE DRAWINGS

The above and other features and advantages of example embodiments will become more apparent by describing in detail, example embodiments with reference to the attached drawings. The accompanying drawings are intended to depict example embodiments and should not be interpreted to limit the intended scope of the claims. The accompanying drawings are not to be considered as drawn to scale unless explicitly noted.

FIG. 1 is a conventional network with a 3$^{rd}$ Generation Partnership Project Long-Term Evolution (3GPP LTE) IP Connectivity Access;

FIG. 2 is a diagram of a conventional E-UTRAN Node B (eNodeB);

FIG. 9 is a method of determining UE bearer throughput by an Network Insight Function Throughput (NIFT) based on the congestion level and average channel conditions, in accordance with an example embodiment; and FIG. 10 is a method of calculating an instant average physical resource block rate, in accordance with an example embodiment.

DETAILED DESCRIPTION

Figure 3:
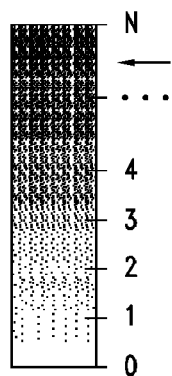
FIG. 3 is a diagram of congestion levels for different channel quality indicator (CQI) classes, in accordance with an example embodiment.
Figure 3:
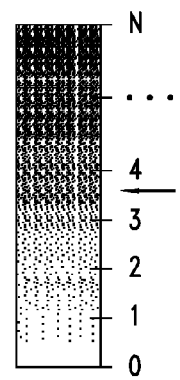
Figure 3:
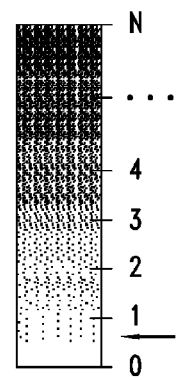

While example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, field programmable gate array (FPGAs), application specific integration circuit (ASICs), the program code or code segments to perform the necessary tasks may be stored in a machine or computer readable medium such as a storage medium, such as a non-transitory storage medium. A processor(s) may perform these necessary tasks.

Specific structural and functional details disclosed herein are merely representative for purposes of describing example embodiments. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of program storage medium or implemented over some type of transmission medium. The program storage medium may be any non-transitory storage medium such as magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments not limited by these aspects of any given implementation.

Cell congestion is associated with the condition where an amount of data sent towards the cell from the IP-PDN network in the downlink direction or from UEs in the uplink direction exceeds cell wireless link throughput capacity. Congestion mitigation is referred to as a process of adjusting an amount of data sent towards the cell to the actual throughput capacity of the cell wireless link. Such adjustment for the downlink direction may be performed by various nodes of the IP-CAN 100 or by AF 109, and in the uplink direction by the UE 110. Non-mitigated congestion results in data traffic delays, IP packet drops by the network, and degraded end user quality of experience, therefore congestion mitigation is a very important component of network and applications optimization.

The basic solution for determining congestion may consist of two basic parts: 1) a description of an effective metric for quantifying a congestion level, and 2) a system and method for computing this congestion level. These two parts are described in detail below.

1. Metric for Measuring Congestion Level—Average PRB Rate (A-PRB-R):

Congestion level for a given quality of service (QoS) Class Identifier (QCI) level may be measured in terms of an average rate of physical resource blocks (average PRB rate, or A-PRB-R) per second that may be expected to be allocated by an eNodeB scheduler for a "very active" (VA) UE bearer. A "bearer" may be defined to be a channel/link with a defined QCI level that is utilized by Radio Access Network and UE to carry an application data traffic. The term "average" may be construed to be a "moving average," with a sliding duration window of t seconds (e.g., t=5 seconds). The VA bearer may be considered a bearer that, at any given duration of time, has data in the wireless link endpoints buffers (eNodeB buffers for the downlink and UE modem buffers for the uplink) and thus continuously attempts to obtain a maximal fair share of PRBs that are available at the given QCI level by the eNodeB scheduler. The congestion level may therefore be defined in terms of ranges of A-PRB-R, and these levels may be separately determined for each QCI level class, and for each traffic direction (i.e., uplink and downlink).

It is important to note that A-PRB-R represents a persistent state of available cell resources that is independent of UE channel conditions, independent of individual UE application behavior, and is practical and informative as A-PRB-R enables the calculation of expected bearer throughput from the congestion level when combined with the knowledge of individual UE channel conditions.

Example Congestion Levels

FIG. 3 is a diagram of congestion levels 0 through N for different QoS Class Identifier (QCI) classes, in accordance with an example embodiment. The N different congestion levels may be defined for the different QCI classes that are used by bearer channels within a network (generally 9 classes exist in LTE, though only classes 2, 7 and 9 are shown in the figure). General definitions of example congestion levels may be:

Congestion Level 0 corresponds to A-PRB-R of 10,000 or more PRBs/sec (where a VA UE gets 20% or more of the resources of a cell operating at 10 Mhz system bandwidth). Without the use of multiple-input-multiple-output (MIMO) configuration, this may translate into a throughput of 7 or more Mbps (at a Modulation Coding Scheme (MCS) of 28) or into 270 or more Kbps (at a MCS 0)). The maximal congestion level N (where for example N may be configured as 10 or 6, or any other number depending upon the desired congestion level granularity, where the larger the value of N the greater the number of congestion levels may be available with less variation in A-PRB-R between each of these congestion levels) corresponds to A-PRB-R of 500 or less PRBs/sec (where a VA UE gets 1% or less of the resources of a cell operating at 10 Mhz system bandwidth). Without the use of MIMO, this may translate into less than 350 Kbps (at a MCS 28) or less than 13 Kbps (at a MCS 0). Other levels may be defined in between these levels.

Figure 4:
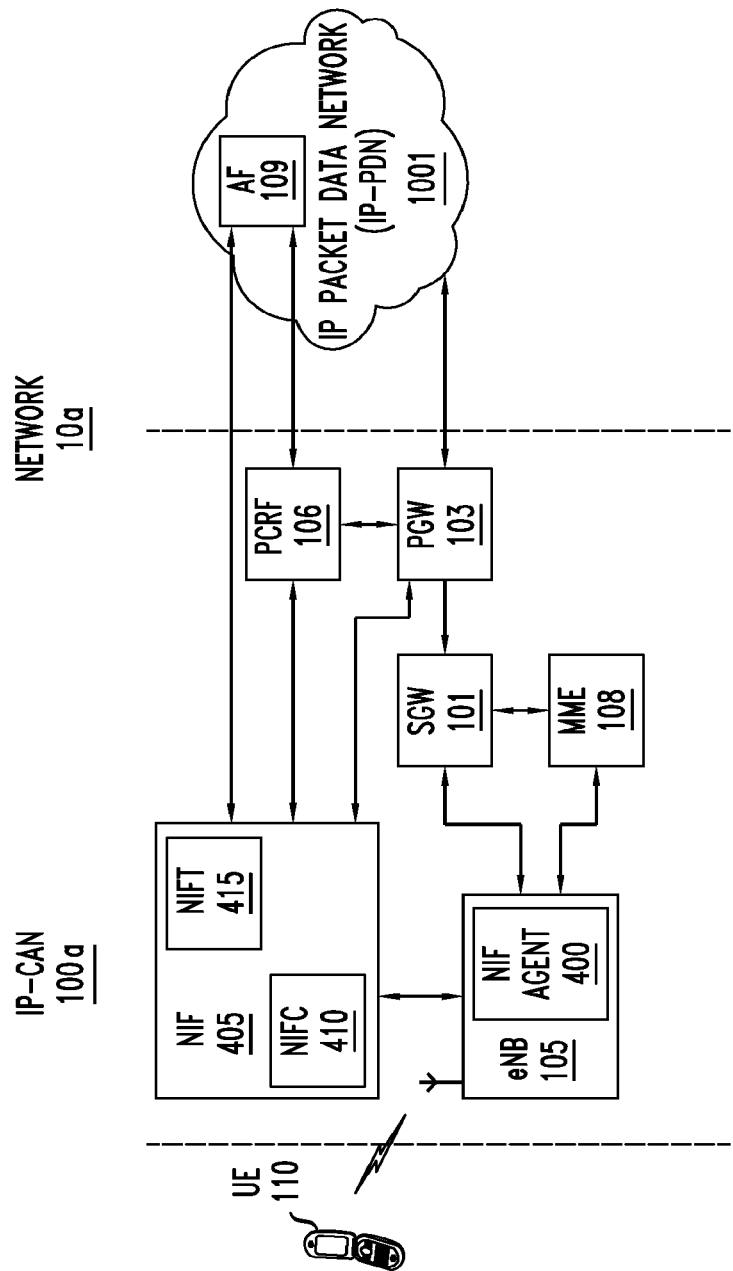
FIG. 4 is a network with 3GPP LTE IP Connectivity Access, in accordance with an example embodiment.
Figure 5:
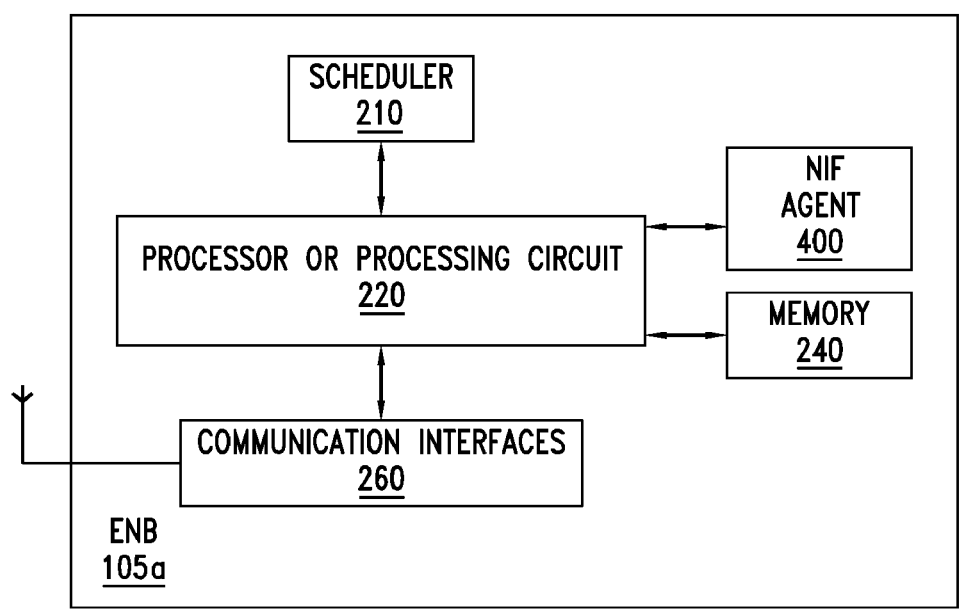
FIG. 5 is a diagram of a E-UTRAN Node B, in accordance with an example embodiment.

2) System and Method for Computing A-PRB-R and Congestion Level:

System Components:

FIG. 4 is a network with 3GPP LTE IP Connectivity Access, in accordance with an example embodiment. The IP-CAN 100a includes the same components as IP-CAN 100 in FIG. 1, with the following additions. The IP-CAN 100a may include network insight function (NIF) 405. NIF 405 may include NIF Congestion (NIFC) module 410 and NIF Throughput (NIFT) module 415 (see FIG. 7). NIFC 410 and NIFT 415 may be controlled by processor 406, utilize memory 404 for reading and writing state information and data, and use communication interfaces 402 to communicate with entities outside of NIF 405. The eNB 105a may include a network insight function (NIF) agent 400 (see FIG. 5). NIF agent 400 may be controlled by processor 220 and may communicate with scheduler 210. NIF agent 400 may extract scheduler information, process this information, and send results to NIFC. The operation and method steps of NIF agent 400 are shown in the method flowchart of FIG. 10 (described in detail herein).

NIFC 410 may utilize information received from NIF Agent 400 to prepare information on congestion levels of eNB 105a while making this information available for various entities in the network 10 (both within IP-CAN 100a as well as within AF 109). The operations of NIFC 410 and NIF Agent 400 are shown in the method flowchart of FIG. 8 (described in detail herein).

NIFT 415 may utilize congestion information received from NIFC 410 together with channel conditions information for individual UEs, to produce bearer throughput information which may be made available to various entities in the network (both within IP-CAN 100a as well as within AF 109). NIFT 415 operation and method steps are shown in the method flowchart of FIG. 9 (described herein).

The information made available by NIFC 410 and NIFT 415 may be utilized by various entities within the IP-CAN 100a to optimize the network by optimizing control and management of traffic load, mitigating congestion, and generally troubleshooting the network or assisting in operations of Self Optimizing Networks (SON), and/or other network planning node.

The information made available by NIFC 410 and by NIFT 415 may also be utilized by AF 109 to optimize the application by adapting the application behavior to the wireless network conditions and improving end user Quality of Experience (QoE). For example, video applications may adjust selection of video encoding rates to the network conditions (e.g. limit rates based in case of congestion or based upon low available throughput, or remove such limit when congestion is no longer present or the available throughput increases). NIFC 410 and NIFT 415 information may be available to AF 109 via direct communication with NIF 405 or via PCRF 106. Alternatively to AF 109 being located in the network, as depicted in FIG. 4, AF 109 may be located within UE 110.

Alternatively to locating NIFC 410 within standalone NIF 405 (as depicted in FIG. 4), NIFC 410 may be located within eNB 105, or within other entities in IP-CAN 100a, such as PGW 103, SGW 101, MME 108 or PCRF 106.

It should also be understood that alternatively to performing initial processing of scheduler information that is described in FIG. 10 by NIF Agent 400 using processor 220, NIF Agent 400 may send partially processed or even raw scheduler information to NIFC 410, and where NIFC 410 may perform the remaining processing using processor 406, as per FIG. 10. However, optimal balance of network communications performance and eNB processor 220 load may be achieved when all steps of FIG. 10 are performed by NIF agent 400 within eNodeB 105a.

Alternatively to placing NIFT 415 within NIF 405 (as depicted in FIG. 4), NIFT 415 may be located within PCRF 106, or PGW 103, or other nodes within IP-CAN 100a, or may also be a standalone node.

Figure 6:
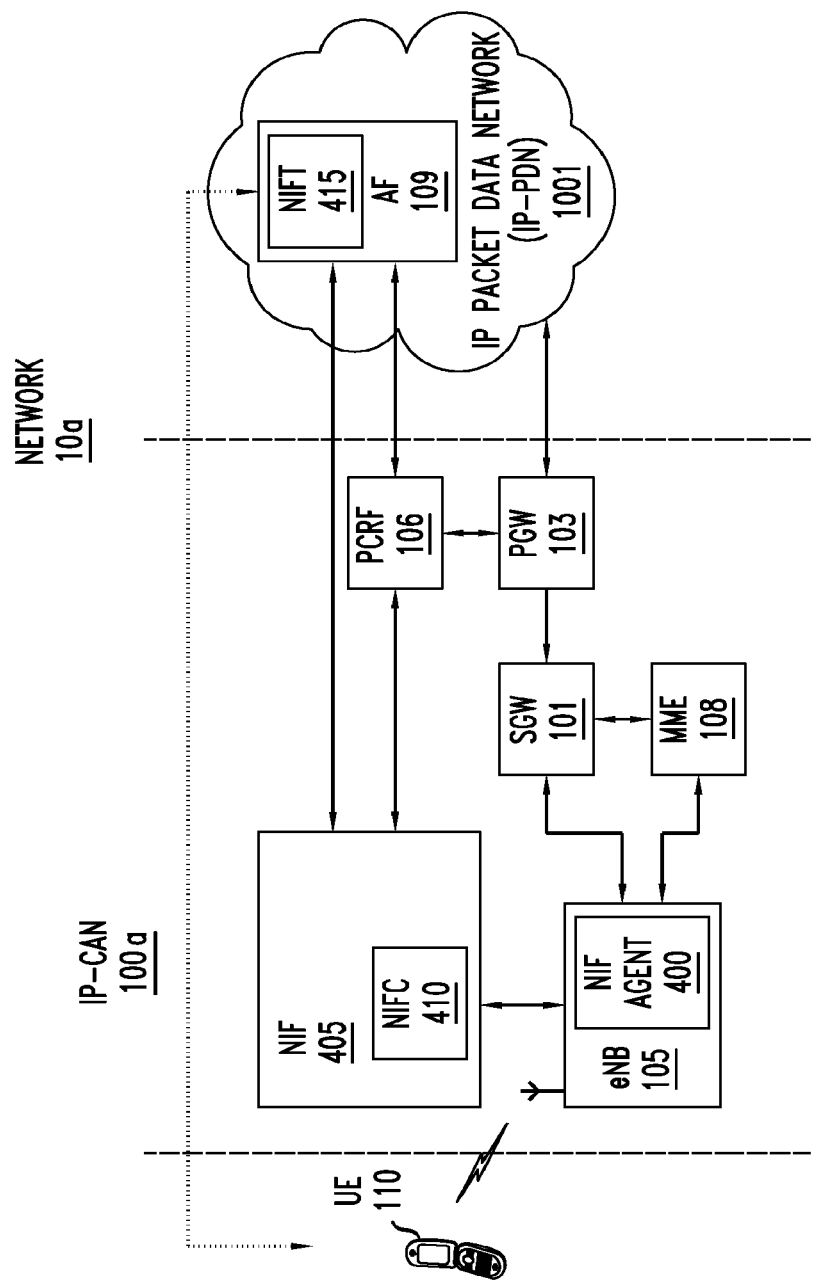
FIG. 6 is another network with 3GPP LTE IP Connectivity Access, in accordance with an example embodiment.

Alternatively to placing NIFT 415 within IP-CAN 100a, NIFT 410 may be located within application function (AF) 109, as depicted in FIG. 6. AF 109 may be located in IP-PDN 1001, as depicted in FIG. 6, or alternatively within UE 110.

FIG. 6 is a network with 3GPP LTE IP Connectivity Access, in accordance with an example embodiment. The network 10a includes the same components as FIG. 4, with the exception that NIFT 415 may be located within AF 109a. NIFT 115 may receive congestion information from NIFC 410 either via direct communications between NIF 405 and AF 109a, or indirectly via PCRF 106, where NIFC 415 provides congestion level information to PCRF 106 and AF 109a retrieves the congestion information from PCRF 106.

Alternatively to AF 109a being located in the IP-PDN network, as depicted in FIG. 6, AF 109a may be located within UE 110.

In an example embodiment, NIFT 415 may receive UE 110 channel condition information as follows. UE 110 may send channel condition information to AF 109a as part of the application session communications over IP-CAN 100a, and AF 109a may pass this channel conditions information to NIFT 415.

Figure 7:
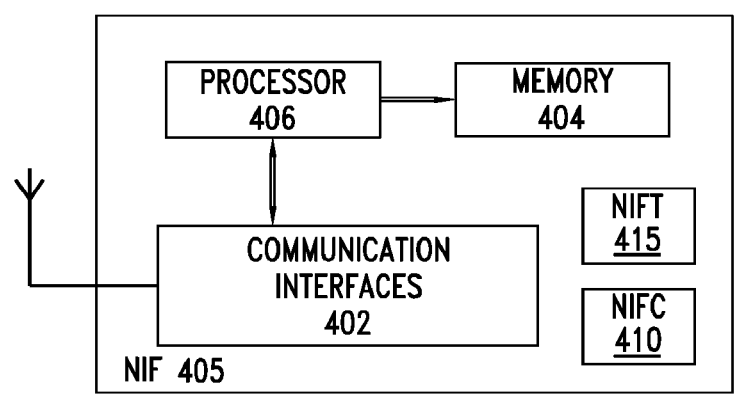
FIG. 7 is a diagram of a network insight function, in accordance with an example embodiment.

As shown in FIG. 7, the dedicated, stand-alone NIF 405 may include a communication interface 402 that may exchange information with eNB 105. NIF 405 may also includes processor 403 that may control the operations of NIF 405, including operations of NIFC 410 and NIFT 415. Memory 404 may be provided to buffer and save data that is calculated, as described in FIG. 8.

Methodology:

The computation of congestion level may be based upon the A-PRB-R computation for each QCI class and each traffic direction (uplink and downlink). Based on this understanding, FIGS. 8-10 describe an example embodiment of a method of calculating the network congestion for a particular QCI and traffic direction. This method may be performed using the system described above (which includes any of FIGS. 4-7). Therefore, it should be understood that each of the following described steps may be performed by the processor 220 of eNodeB 105a (which is controlling NIF agent 400, the processor 406 of NIF 405), or another processor included in a network node containing NIF Agent 400, NIFC 410, or NIFT 415. However, for simplicity, the following steps are described as being performed by a "processor" (as this term is defined above). Alternative to calculations being divided between NIF agent 400 and NIFC 410 and performed at different network nodes, it should be understood that these calculations could instead be performed at a same one network node. Therefore, while the method describes performing the method steps at a "processor," it should be understood that the "processor" may be more than one network node processor.

In step S800 (FIG. 8), processor records each transmission time interval (TTI) data for both downlink and uplink directions that are obtained from the scheduler 210 of eNB 105. This data may include bearer identifiers as well as state information data that includes QCI levels for each bearer, traffic direction information (either uplink or downlink), a number of allocated PRBs, modulation and coding scheme (MCS) used, a number of transmitted bits sent (TBS), an indication of whether data transmissions are "useful" (a first time the transmission is being transmitted) or "retransmission" (a retransmission of data that had previously been transmitted).

In step S805, instant A-PRB-R averages and auxiliary data averages may be calculated, which is shown in FIG. 10, and described below. The term 'instant' is used here to denote A-PRB-R average that are only valid for a short time interval ($\Delta t_1$). In one example embodiment time interval ($\Delta t_1$) may be configured at the processor to be 1 second, In step S1000 of FIG. 10, the processor may record the schedulers 210 allocation of resources for a past time interval ($\Delta t_1$).

In step S1005, the processor may estimate an available total PRB-R (which is an aggregate PRB-R that may be shared by all bearers in this QCI) for each QCI level k and uplink or downlink direction which may be denoted as $A_k$). In one example embodiment $A_k$ may be calculated separately for uplink and downlink directions using the following equations.

For Guaranteed Bit Rate (GBR) QCIs (k=1, 2, 3, or 4):

First determine S1 to be $S1=S^*(1-\delta)$     (Equation 1)

Where $\delta$ being a configurable parameter representing fraction of PRBs not allocated for data bearers (e.g. $\delta$ may be configured at the processor to be 0.05 or 0.1, or alternatively computed as an average over larger time intervals ($M^*\Delta t_1$) (where in one embodiment M may be configured as bigger than 10) from the recorded per TTI data, or alternatively provided as a feedback parameter from NIFC 410 to NIF agent 400. S may be a total number of system PRBs per second (e.g., 50,000 for a 10 Mhz system with 50 PRBs per TTI multiplied by 1000 TTIs per second).

Next S2 may be calculated as, $S2=S1-$[average total number of PRBS for the other GBR QCIs]     (Equation 2).

In this equation the average total aggregate number of PRBs used by other GBR QCIs is subtracted from S1. In one example embodiment this average number can be computed from the recorded per TTI data as a statistical average over larger time intervals ($M^*\Delta t_1$) (where in one example embodiment M may be configured as bigger than 10).

Next calculate S3 as $S3=S2-$[minimum average number of PRBS for non-GBR QCI bearers QCIs]     (Equation 3).

In this equation the minimal average number of PRBs needed to avoid starvation of non-GBR QCI flows is subtracted from S2. In one example embodiment this average number may be computed based on the number of active non-GBR bearers from the data recorded in S800 of FIG. 8] The definition of an active bearer is given in the description of the step S1010 below.

Lastly, determine $A_k$ as $A_k=S3^*$[ratio of useful PRBS]     (Equation 4)

Where the ratio of useful PRBs may be configured or calculated as ([total aggregate number of useful PRBs]/[total aggregate number of PRBs]) over the time interval $\Delta t_1$), which translates into an average for all bearers (though alternatively, this may be calculated only for bearers of a QCI of interest).

For Non-GBR QCIs (k=5, 6, 7, 8, or 9):

First calculate S1 using Equation 1 for GBR QCI,
$S1=S^*(1-\delta)$     (Equation 5)

Where $\delta$ and S are the same as in Equation 1 for GBR QCIs.

Next S2 may be calculated as $S2=S1-$[average total number of PRBS for all GBR QCIs]     (Equation 6).

This equation differs from Equation 2 for GBR QCIs in that in Equation 6 the total average number of PRBs for all GBR QCIs is subtracted from S1, whereas in Equation 2 the average number subtracted is for GBR QCIs excluding QCI k in question.

Next S3 may be determined in one of two ways, depending on a scheduling type that is used by scheduler 210.

For Proportional Weighted Fair Share Scheduling:

$S3=\Sigma_{j=5, j=9, j\neq k}$ min(average PRBS by QCI $j$, $S2^*w_j$)     (Equation 7)

In Equation 7 S2 may be reduced further by a number that reflects that each non-GBR QCI j class has to receive on average not less than a weighted fair share fraction $w_j$ of remaining resources if there is a demand for such resources recorded over the past time interval $\Delta t_1$. If the actual demand for certain QCI j is less than the maximal fair share, then the actual recorded demand is subtracted.

Where $w_j$ are normalized weights ($\Sigma_{j=5}^{9} w_j = 1$). In one example embodiment the $w_j$ are configured at the scheduler for the proportional weighted fair share scheduling For Strict Priority Scheduling:

$$S3 = S2 - [\text{average number of PRBS used by QCIs 5 to } (k-1)] - [\text{minimum average number of PRBs for bearer QCIs } (k+1) \text{ to } 9] \quad \text{(Equation 8)}$$

In Equation 8 S2 may be reduced by the PRBs given to recorded in step S800 active bearers at higher priority non-GBR QCIs, and then further reduced by a minimal amount of PRBs needed for avoid starvation of the recorded in step S800 active bearers at the lower priority non-GBR QCIs.

Once S3 is calculated (using either Equation 1 or 2, above), S4 may then be determined as follows.

$$S4 = S3 * ([\text{ratio of useful PRBs}]) \quad \text{(Equation 9)}$$

Where the ratio of useful PRBs is the same as in the Equation 4 for GBR QCI.

In step S1010, the processor may classify all active bearers for each non-GBR (guaranteed bit rate) as being either very active (VA) or less active (LA) users and calculates the number of VA and LA bearers for the particular QCI k class ($1 \leq k \leq 9$) separately for uplink and downlink traffic direction. A bearer is "active" if the bearer uses on average at least $\gamma$ PRBs/sec. In one example embodiment $\gamma$ may be configured at the processor as a number greater than 30. Among these active users, the processor then determines if the bearers are "very active" (VA, see definition above) or "less active" (LA) bearers. Examples of LA bearers may include bearers carrying Internet Control Message Protocol (ICMP) traffic (ping), intermittent File Transfer Protocol (FTP) download or upload of small files, voice traffic, and "light" web browsing, while examples of VA bearers may include bearers that carry applications such as FTP of large files, progressive downloading of long duration video, Adaptive Streaming (HAS) video with non-full client buffers, and "heavy" web browsing.

LA bearers are bearers that, due to application needs or IP transport layer flow control such as transmission control protocol (TCP) flow control or traffic delays outside of wireless network, consume less than a maximal available fair share of PRBs (i.e., less than the maximum fair share PRB-R), unlike VA bearers which utilize on average close of the maximal available share of PRB-R.

In one example embodiment, LA bearer uses, on average over the time interval ($\Delta t_1$), less than $[A_k(1-\Delta_k)/N_k]$ PRBs/sec (Equation 10)

Where $A_k$ is calculated in S1005, $\Delta_k$ is a configurable threshold, and $N_k$ may denote the number of active bearers).

In another example embodiment, LA bearers may be classified in iterative steps each eliminating more LA bearers until a convergence condition is met. After each iteration the classified LA bearers and the PRBs utilized by these bearers are discounted, and in the next iteration the remaining bearers may be again classified based upon Equation 10 (see more details in the example embodiments below). Once the LA bearers and VA bearers are identified for QCI=k class, $N_{kO}$ may denote the number of LA bearers, and $N_k - N_{KO}$ may denote the number of VA bearers.

Additionally, in the event that $N_k - N_{KO} = 0$ (all bearers are LA), then the remaining steps of this method may be performed by replacing the one "most active" bearer (i.e., the one bearer with the highest average PRB-R), among the active bearers, with a "theoretical VA" bearer designation. This "theoretical VA" bearer may be assigned the remaining extra average PRB-R (i.e., the PRB-R that is left over following all PRBs for ($N_{kO}-1$) LA bearers being accounted for).

Example Calculations to Classify Active Bearers into VA/LA for Non-GBR Bearers:

Based on the description above, it should be understood that for GBR QCIs, there is only one VA bearer per QCI, and this is the one "most active" bearer that uses a maximal number of PRBs. However, for non-GBR QCIs, the classification may involve the following steps, shown below.

Iteration 1 for Fair Share PRBs for QCI k and a Given Traffic Direction:

Determine less active bearer rate as $FS1 = A * (1-\Delta)/N$ (Equation 11)

Equation 11 is the same as the Equation 10 above, with the index k omitted to simplify the notation.

Where A is obtained from step S1005, and A is a configurable parameter. N is the total number of active bearers All active bearers that have actual PRB-R less than FS1 are to be classified as LA. All remaining active bearers that are not classified as LA after iteration 1 are classified as non-LA.

Iteration 2:

Determine less active bearer rate as $FS2 = (S - [\text{summation of LA PRBs}]) * (1-A)/[\text{the number of non-LA bearers}]$ (Equation 12)

The remaining non-LA bearers with actual PRB-R less than FS2 are to be also classified as LA, following the second iteration. All remaining active bearers that are not classified as LA after iteration 2 are classified as non-LA.

Further Iterations:

This process of iteration 2, shown above, is to be repeated until the number of remaining non-LA active bearers is one of 1 and 0, or until an absolute value of a difference between the iteratively determined less active bearer rate and a number of PRBs for the one "most active" bearer is below a threshold $\Delta$. Where $\Delta$ is the same as in Equation 11.

The remaining non-LA bearers after the iteration process is completed are classified as VA.

Based on the example calculations to classify active bearers into VA/LA for non-GBR bearers, two working numeric examples of these calculations are also shown below.

Working Example Calculations to Classify Active Bearers into VA/LA for Non-GBR Bearers Example 1

Assuming there are 4 UEs served by the 10 Mhz cell without MIMO, each UE has only one bearer in the downlink direction, the bearer being at QCI level 9, and A=0.1, where all PRBs are "useful." Since each UE only has only one associated bearer in the downlink direction, we further refer to the bearers by UE number (e.g. UE1). For downlink direction UE1 uses 25000 prb/sec (UE1, UE2 uses 15000 prb/sec, UE3 uses 3000 prb/sec, and UE4 uses 2000 prb/sec.

Then for downlink direction FS1=(50000*0.9)/4=11250 prb/sec, hence UE3 and UE4 are LA $FS2 = (50000 - (2000+3000))*0.9/2 = 20250$, hence UE2 is also LA The Iteration Process May Cease Here, Since there is Only One Non-LA Bearer Remains (UE1, which is the Most Active Bearer).

Therefore the A-PRB-R=50000−(2000+3000+15000)=30000, for QCI 9 and the downlink direction.

Note that the same result would occur by giving UE1 all extra PRBs.

Based on the above, there is 1 VA and 3 LA, and the A-PRB-R is 30000.

Example 2

Assuming that there are only UEs with a single bearer in downlink direction each at QCI level 9 served by the 10 Mhz cell (no MIMO) exist, and A=0.1, where all PRBs are "useful". Since each UE only has one associated bearer in the downlink direction, we further refer to the bearers by UE number. UE1 in the downlink direction uses 5000 prbs/sec, UE2 in the downlink direction uses 4900 prbs/sec, UE3 in the downlink direction uses 4800 prbs/sec, ..., UEn in the downlink direction uses (5000−100*(n−1)) for n<9, UE9 in the downlink direction uses 4200 prbs/sec.

UE10 and UE 11 in the downlink direction both use 3000 prbs/sec, and UE12, UE13, UE14, UE15, ..., E20 all use 180 prbs/sec in the downlink direction Total all UEs use aggregate=(4200*9+9*10*100/2)+ 2*3000+1620=49920 prbs/sec in the downlink direction $FS1=50000*0.9/20=2250$, hence UEs from 12 to 20 that use less than $FS1$ PRBs are LA.

$FS2=(50000−1620)*0.9/11=3958$ hence UEs 10 and 11 are LA $FS3=(50000−1620−6000)*0.9/9=4708$, Since |FS3−5000|<5000*0.1, the process ends here.

Therefore, there are 9 VA and 11 LA users for QCI 9 in the downlink direction, with A-PRB-R=FS3=4708.

In step S1015, the processor may calculate for each non-GBR QCI class k an average total PRB-R for all LA bearers (which may be denoted $L_k$). This may be calculated at the processor by adding recorded numbers of PRBs utilized by the identified LA bearers at QCI k for the duration of last $\Delta t_1$ time interval and then dividing the result by $\Delta t_1$.

In step S1020, the processor may determine the "instant" A-PRB-R for each GBR QCI and for each of the uplink and downlink directions. The term instant refers here to the average over a short period of time (AO. Such instant averages may vary significantly between consecutive time intervals. In one embodiment determining the instant A-PRB-R may be accomplished for each GBR QCI and for each of the uplink and downlink traffic directions with the following calculation.

First a most active GBR bearer (the bearer that consumed maximal number of PRBs over the past ($\Delta t_1$) interval) for the QCI and the traffic direction is determined. This GBR bearer may be determined by comparing summations of all the PRBs for each GBR bearer in this QCI from the data recorded at S800. Denote R to be the number of PRBs consumed during ($\Delta t_1$) by this GBR bearer.

Next determine the number of extra available PRBs that the most active GBR bearer may get. In one example embodiment the number of extra available PRBs may be calculated as, E=[available aggregate PRB-R for all bearers at this QCI]−[PRBs that are "owed" to all other GBR bearers for the particular QCI, if a current PRB consumption rate for this QCI is below a guaranteed rate] (Equation 13)

Note that the PRBs that are "owed" in the Equation 13 is a function of GBR characteristics, a current rate for the past ($\Delta t_1$) interval, and a MBR (maximum guaranteed bit rate) of all GBR users.

Then A-PRB-R for this QCI and the traffic direction is calculated as follows.

$$\text{A-PRB-R}=(R+E)/(\Delta t_1) \quad \text{(Equation 14)}$$

In step S1025, the "instant" A-PRB-R for each non-GBR QCI and traffic direction is calculated as follows. As above for GBR QCI the term "instant" refers here to the average over a short period of time ($\Delta t_1$). Such instant averages may vary significantly between consecutive time intervals.

$$\text{A-PRB-R}=\{(A_k-L_k)/(\text{number of VA bearers for a particular QCI})\}/(\Delta t_1) \quad \text{(Equation 15)}$$

Where $A_k$ is determined in step S1005, $L_k$ is determined in step S1015, and the number of VA bearers is determined in step S1010.

In step S1030, averages over ($\Delta t_1$) time interval and auxiliary data on a per QCI and per traffic direction basis may be calculated. This auxiliary data may include (where the data may be presented on a per QCI basis and on a per traffic direction basis): number of VA and LA bearers, aggregate number of PRBs, number of PRBs per MCS (for all bearers, and for each individual bearer), number of retransmission PRBs per MCS (for all bearers, and for each individual bearer), number of transmitted bits sent (TBS) (for all bearers, and for each individual bearer), and GBR/MBR settings for GBR bearers.

Figure 8:
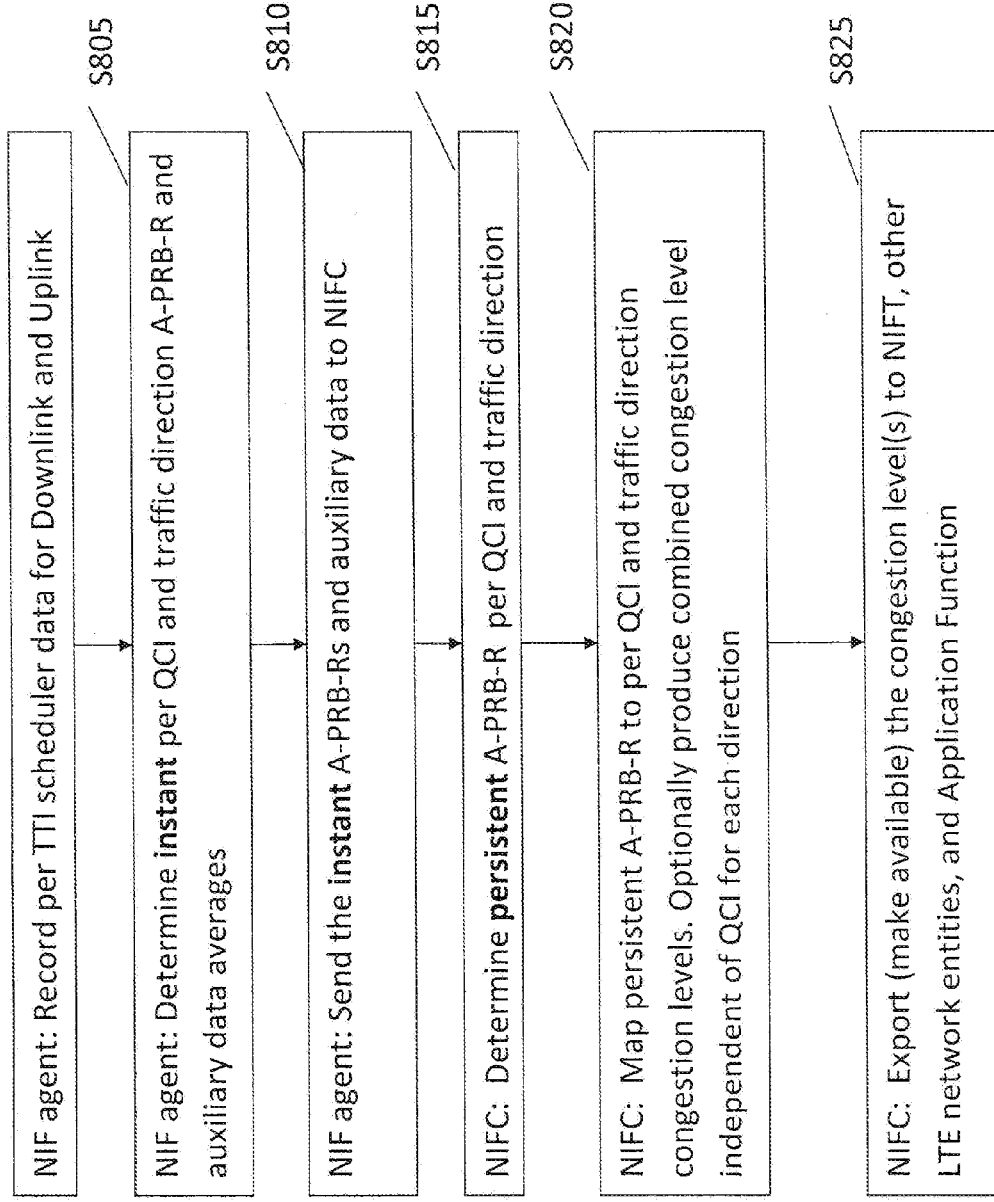
FIG. 8 is a method of calculating network congestion using an average physical resource block rate, in accordance with an example embodiment.

Based on the discussion of FIG. 10 (above, which details S805 of FIG. 8), in step S810 of FIG. 8, the instant A-PRB-R averages and average auxiliary data determined in step S1030 may be transmitted by NIF agent 400 to NIFC 405.

In step S815, "persistent" A-PRB-R per quality class indicator (QCI) may be determined by the NIFC. The term "persistent" refers to A-PRB-R being more stable and remaining in a certain range for a long compared to ($\Delta t_1$) period of time. In one example embodiment this "persistent" data may be a result of applying known smoothing techniques such as longer term statistical averages and statistical noise reduction filtering, where statistical outliers and uncharacteristic extreme oscillations may be removed to smooth this average information data.

In step S820, the computed persistent A-PRB-R may then be mapped to a congestion level, using predefined A-PRB-R ranges for each potential congestion level (as shown for instance in FIG. 3, and as described above). In one example embodiment the mapping may be accomplished separately for each QCI level for downlink and for uplink directions. In another example embodiment the mapping may produce an aggregate congestion level for each direction that is independent of QCI levels.

The congestion levels may be defined as contiguous ranges for A-PRB-R, or as a function of A-PRB-R (e.g., using a log function, a polynomial, etc.) The congestion level ranges may be configurable. In one example embodiment the aggregate (QCI independent) congestion level may be calculated based on a weighted sum of per QCI A-PRB-Rs. In another example embodiment the aggregate (QCI independent) congestion level may be determined as the one equal to the congestion level for a lowest priority QCI for which traffic in the given direction is present.

In step S825, the congestion level information (from step S820) is exported (made available) to NIFT 405, various IP-CAN 100a, and application function 109a (FIG. 4, and FIG. 7). In one example embodiment NIFC 410 may send at least one computed congestion level of at least one eNB 105 to NIFT 415. In another example embodiment the NIFC 410 may send at least one computed congestion level of at least one eNB 105 to PCRF 106 to enable PCRF 106 to perform network optimization for the determined congestion levels. In another example embodiment NIFC 410 may send at least one computed congestion level of at least one eNB 105 to other IP-CAN 100a nodes, like PGW 103, SGW 101 or MME 108. In one example embodiment PCRF 106 may use the received congestion level information to determine congestion mitigation policies that may place limits on the data traffic to mitigate congestion and optimize the network. In one example embodiment PCRF 106 may send at least one computed congestion level of at least one eNB 105 or the determined congestion mitigation and network optimization policies to PGW 103. In another example embodiment PCRF 106 may further send at least one computed congestion level of at least one eNB 105 or the determined congestion mitigation and network optimization policies to AF 109. In yet another example embodiment NIFC 410 may send at least one computed congestion level of at least one eNB 105 directly to AF 109 or AF 109a. In one example embodiment AF 109 or AF 109a may be located within UE 110. In an example embodiment, AF 109 and AF 109 a use the received eNB 105 congestion level information to optimize the application behavior for the eNB 105 congestion level.

FIG. 9 is a method of determining by NIFT 415 the throughput of one or more bearers of a UE 110 served by the eNB 105 based on the received congestion level information for the eNB 105 and additional channel conditions information of the UE 110 (within the architecture depicted in FIG. 4 and FIG. 6), in accordance with an example embodiment.

In step S925, NIFT 415 receives congestion level information from NIFC 410.

In step S930, NIFT 415 also receives average channel conditions of at least one UE 110.

In an example embodiment the average channel conditions for the UE 110 may be received in one or more of the following forms: average Signal to Interference and Noise Ratio (SINR), average Channel Quality Indicator (CQI) as reported by the UE 110, average Modulation Coding Schema (MCS) as reported by the scheduler 210, and average Transmitted Bits Sent (TBS) slope index. The TBS slope index is an average number of bits that are packed by the scheduler into a single PRB. In one embodiment the TBS slope index may be calculated as an average over a time interval ($\Delta t$) of a ratio computed for each TTI [TBS/[number of allocated PRBs]. In another example embodiment the TBS slope index may be calculated for each MCS value from 3GPP TS36.213 tables 7.1.7.1-1 and 7.1.7.2.1-1 as a slope of linear approximation of the TBS as a function of number PRBs using statistical methods such as a least squares method.

In an example embodiment (FIG. 4) NIFT 415 located within the LTE network may receive the average channel conditions and bearer QCI information for the UE 110 from the NIF agent 400. In an example embodiment the NIF agent 400 determines the average channel conditions from the information recorded at the step S800.

In another example embodiment (FIG. 6) NIFT 415 located within AF 109a in IP-PDN may receive the average channel conditions from the UE 110. In yet another example embodiment NIFT 415 located within Application Function 109a in the UE 110 may retrieve the average channel conditions information locally from the UE 110.

In step S932, NIFT 415 determines whether congestion level is received on a per QCI basis (versus on an aggregate basis that is independent of QCI level). It should be understood that this determination may be made based on what kind of congestion level information is received in step S925.

In the event that congestion level is received on a per QCI basis, NIFT 415 may derive an average UE throughput using known table lookup from TS36.213 tables 7.1.7.1-1 and 7.1.7.2.1-1 based on average channel conditions of the UE 110 and the per QCI A-PRB-R that may then be reverse mapped to congestion level ranges such as those shown in FIG. 3. In one example embodiment the A-PRB-R value may be chosen as the median value of the range corresponding to the congestion level.

If congestion level is determined on an aggregate basis (independent of QCI level), as decided in step S932, then in step S940 NIFT 415 may derive a rough estimate of average UE throughput using known table lookup from TS36.213 tables 7.1.7.1-1 and 7.1.7.2.1-1 based on average UE channel conditions and the aggregate A-PRB-R that may then be reverse-mapped to congestion level ranges (that may be identical to FIG. 3, but on an aggregate basis, rather than on a QCI level basis). In one example embodiment the A-PRB-R value may be chosen as the median value of the range corresponding to the congestion level.

In both steps S935 and S940, it should be noted that 3GPP TS36.213 tables 7.1.7.1-1 and 7.1.7.2.1-1 allow for calculating a number of bits of data sent per TTI using a number of PRBs per TTI and MCS value. If the channel conditions of the UE are available in the form of average SINR or average CQI, the corresponding average MCS may be derived using known methods. The average TBS slope index may be derived from the average MCS as a slope of linear approximation using known statistical methods such as a least squares method. The bearer or UE 110 throughput range is calculated as a product of A-PRB-R (obtained using reverse mapping of congestion level to A-PRB-R range) by average TBS slope index. The resulting throughput may be further conservatively reduced by a configurable factor (e.g. 90%).

It should be noted that the above calculation may be generalized to a scenario where the eNB scheduler is not resource fair, but instead weights different bearers with different fixed priorities within a same QCI class. In such a scenario, the total number of VA bearers should be computed as a weighted sum over all of the VA Bearers. Correspondingly a maximal fair share for each bearer will take into the account the relative priorities for the different bearers.

In step S945, the throughput information calculated in S940 is exported (made available) to various IP-CAN 100a nodes and AF 109 (FIG. 4), or AF 109a (FIG. 7).

In an example embodiment (FIG. 4) NIFT 415 located within IP-CAN 100a may send the computed throughput information for at least one of the bearer and UE 110 to PCRF 106; PCRF 106 uses the received throughput information to optimize IP-CAN 100a network behavior for the determined application throughput. In another example embodiment NIFT 415 may send the computed throughput information for at least one of the bearer and the UE 110 to other IP-CAN 100a nodes, like PGW 103, SGW 101 or MME 108. In one example embodiment PCRF 106 may use the received from NIFT 415 throughput information to determine per bearer or per UE 110 throughput limiting policies. In one example embodiment PCRF 106 may send at least one of the received from NIFT 415 throughput information and the determined throughput limiting policies to PGW 103. In another example embodiment PCRF 106 may further send at least one of the received from NIFT 415 information and the determined throughput limiting policies to AF 109 (FIG. 4). In yet another example embodiment NIFT 415 may send the computed throughput information for at least one of the bearer and UE 110 directly to AF 109 (FIG. 4). The AF 109*a* may further use the throughput information received from NIFT 415 to optimize the application.

In an example embodiment (FIG. 7) NIFT 415 located within AF 109*a* (which in turn may be located either in IP-PDN or within UE 110) may pass the the computed throughput information for at least one of the bearer and the UE 110 directly to AF 109*a*. The AF 109*a* may further use the throughput information received from NIFT 415 to optimize the application for the network throughput.

It should be understood that the above methodology and systems are not limited to LTE IP-CAN. Rather, the methodology and systems may be implemented on any wireless technology (e.g., 2G, 3G, 4G, 5G, etc.) that utilizes an uplink or downlink scheduler to allocate physical resources (i.e., physical resource blocks or other resource units) of cells.

Example embodiments having thus been described, it will be obvious that the same may be varied in many ways. Such variations are not to be regarded as a departure from the intended spirit and scope of example embodiments, and all such modifications as would be obvious to one skilled in the art are intended to be included within the scope of the following claims.

What is claimed is:

1. A method of determining cell congestion, comprising:
determining, by one or more processors of at least one network node, an average physical resource block rate to be allocated by a scheduler for very active bearers, the very active bearers being bearers that continuously attempt to obtain a maximal fair share of physical resource blocks that are available by the scheduler for a given duration of time, the determining of the average physical resource block rate including,
subtracting an aggregate physical resource block rate for less active bearers from an available aggregate physical resource block rate and dividing by the number of very active bearers, the average physical resource block rate and the available aggregate physical resource block rate being for a particular quality of service level and traffic direction;
mapping, by the one or more processors, the average rate of physical resource blocks to congestion levels to produce congestion level information; and
exporting, by the one or more processors, the congestion level information.

2. The method of claim 1, wherein the exporting of the congestion level information includes forwarding the congestion level information to at least one of an application function and an IP connectivity access network function that controls an application data flow to mitigate congestion.

3. The method of claim 1, wherein the estimating the available aggregate physical resource block rate includes,
determining a total number of system physical resource blocks (PRBs) available for data transmissions,
determining a ratio of useful PRBs, wherein the ratio of useful PRBs is a ratio of a total number of PRBs utilized in useful data transmissions to the total number of system PRBs available for data transmissions, the useful data transmissions being transmissions that are not re-transmissions of data,
determining a first average aggregate number of PRBs needed for bearers that belong to other quality of service guaranteed bit rate (GBR) levels, the other quality of service GBR levels being quality of service GBR levels that are different from the particular quality of service level,
determining a second average aggregate number of PRBs needed for bearers belonging to higher priority non-GBR quality of service levels, the higher priority non-GBR quality of service levels being non-GBR quality of service levels with a higher priority than the particular quality of service level,
determining a minimum average aggregate number of PRBs needed for bearers belonging to lower priority non-GBR quality of service levels, the lower priority non-GBR quality of service levels being non-GBR quality of service levels with a lower priority than the particular quality of service level,
calculating the available aggregate physical resource block rate by subtracting the first average aggregate number of PRBs, the second average aggregate number of PRBs, and the minimum average aggregate number of PRBs from the total number of system physical resource blocks, and multiplying the result by the ratio of useful PRBs.

4. The method of claim 3, wherein the classifying of active bearers into very active bearers and less active bearers includes,
performing a first iteration by,
determining a first less active bearer rate by dividing the available aggregate physical resource block rate by a number of active bearers,
classifying active bearers that have a PRB rate below the less active bearer rate as being a first subset of less active bearers, and
classifying active bearers that have a PRB rate above the less active bearer rate as being non-less active bearers.

5. The method of claim 4, wherein the classifying of active bearers into very active bearers and less active bearers further includes,
performing a second iteration by,
determining a second less active bearer rate by subtracting a summation of physical resource blocks for the first set of less active bearers from the total number of system physical resource blocks and dividing by a number of the non-less active bearers,
classifying active bearers that have a PRB rate below the second less active bearer rate as being a second subset of less active bearers,
the less active bearers being a summation of the first and second subset of less active bearers,
the non-less active bearers being active bearers that are not classified as less active bearers.

6. The method of claim 5, wherein the classifying of active bearers into very active bearers and less active bearers further includes,
repeating the performing of the second iteration until a number of the non-less active bearers is 0 or 1, or until an absolute value of a difference between a PRB rate for a most active user and an iteratively determined less active bearer rate is below a threshold,
the most active user being a user with a largest physical resource block rate,
the iteratively determined less active bearer rate being a less active bearer rate for a particular iteration during the repeating of the performing of the second iteration, determining the very active bearers as being active bearers that are not classified as less active bearers following the repeating of the performing of the second iteration.

7. The method of claim 1, wherein the average rate of physical resource blocks is a persistent average rate of physical resource blocks over a first time interval that is based on an instant average rate of physical resource blocks and averages of auxiliary data, the instant average rate of physical resource blocks being an average rate of physical resource blocks over a second interval that is shorter than the first time interval, the averages of auxiliary data including at least one of a number of very active bearers and less active bearers, an available aggregate physical resource block rate, a number of physical resource blocks per modulation and coding scheme (MCS) on an aggregate basis or individual bearer basis, a number of retransmission physical resource blocks per MCS on an aggregate basis or individual bearer basis, a number of transmitted bits sent (TBS) on an aggregate basis or individual bearer basis, and guaranteed bit rate (GBR)/maximum bit rate (MBR) settings for GBR bearers.

8. A method of determining average available wireless network throughput for a user equipment (UE) bearer of a wireless Internet Protocol Connectivity Access Network (IP-CAN), comprising:

receiving, by one or more first processors of a first node, an average physical resource block rate in the form of cell congestion level information for a cell from a second node, the second node being part of the IP-CAN, wherein the average rate of physical resource blocks is a persistent average rate of physical resource blocks over a first time interval that is based on an instant average rate of physical resource blocks and averages of auxiliary data;

receiving, by the one or more first processors, average channel condition information for at least one UE served by the cell;

calculating, by the one or more first processors, an average bearer throughput for the UE based on the average physical resource block rate and the average channel condition information; and exporting, by the one or more processors, the average bearer throughput for the UE.

9. The method of claim 8, wherein the average channel condition information includes at least one of an average signal to noise ratio (SINR) as reported by a user equipment, an average modulation and coding scheme (MCS) index as reported by a scheduler, and an average transmitted bits sent (TBS) slope index.

10. The method of 9, wherein the exporting includes forwarding the average bearer throughput for the UE to at least one of the application function and an internet protocol connectivity access network (IP-CAN) function that controls an application data flow.

11. The method of claim 8, wherein the receiving of the average channel condition information for at least one UE is received by the second node.

12. The method of claim 8, wherein the receiving of the average channel condition information for at least one UE is received from the UE.

13. The method of claim 8, wherein the first node is one of an application function (AF) in internet protocol packet data network (IP-PDN) and an AF at the UE.

14. The method of claim 8, wherein the first node is in the IP-CAN.

15. The at least one network node of claim 14, wherein the instant average rate of physical resource blocks being an average rate of physical resource blocks over a second interval that is shorter than the first time interval, the averages of auxiliary data including at least one of a number of very active bearers and less active bearers, an available aggregate physical resource block rate, a number of physical resource blocks per modulation and coding scheme (MCS) on an aggregate basis or individual bearer basis, a number of retransmission physical resource blocks per MCS on an aggregate basis or individual bearer basis, a number of transmitted bits sent (TBS) on an aggregate basis or individual bearer basis, and guaranteed bit rate (GBR)/maximum bit rate (MBR) settings for GBR bearers.

16. At least one network node, comprising:

one or more a processors configured to, determine an average physical resource block rate to be allocated by a scheduler for very active bearers, the very active bearers being bearers that continuously attempt to obtain a maximal fair share of physical resource blocks that are available by the scheduler for a given duration of time, the determining of the average physical resource rate block including, subtracting an aggregate physical resource block rate for less active bearers from an available aggregate physical resource block rate and dividing by the number of very active bearers, the average physical resource block rate and the available aggregate physical resource block rate being for a particular quality of service level and traffic direction;

map the average rate of physical resource blocks to congestion levels to produce congestion level information; and export the congestion level information.

17. The at least one network node of claim 16, wherein the one or more processors exports the congestion level information by being further configured to, forwarding the congestion level information to at least one of an application function and an IP connectivity access network function that controls an application data flow to mitigate congestion.

18. The at least one network node of claim 16, wherein the one or more processors estimates the available aggregate physical resource block rate by being further configured to, determine a total number of system physical resource blocks (PRBs) available for data transmissions, determine a ratio of useful PRBs, wherein the ratio of useful PRBs is a ratio of a total number of PRBs utilized in useful data transmissions to the total number of system PRBs available for data transmissions, the useful data transmissions being transmissions that are not re-transmissions of data, determine a first average aggregate number of PRBs needed for bearers that belong to other quality of service guaranteed bit rate (GBR) levels, the other quality of service GBR levels being quality of service GBR levels that are different from the particular quality of service level, determine a second average aggregate number of PRBs needed for bearers belonging to higher priority non-GBR quality of service levels, the higher priority non-GBR quality of service levels being non-GBR quality of service levels with a higher priority than the particular quality of service level, determine a minimum average aggregate number of PRBs needed for bearers belonging to lower priority non-GBR quality of service levels, the lower priority non-GBR quality of service levels being non-GBR quality of service levels with a lower priority than the particular quality of service level, calculate the available aggregate physical resource block rate by subtracting the first average aggregate number of PRBs, the second average aggregate number of PRBs, and the minimum average aggregate number of PRBs from the total number of system physical resource blocks, and multiplying the result by the ratio of useful PRBs.

19. The at least one network node of claim 18, wherein the one or more processors classifies the active bearers into very active bearers and less active bearers by being further configured to, perform a first iteration by,
performing a first iteration by,
determine a first less active bearer rate by dividing the available aggregate physical resource block rate by a number of active bearers,
classify active bearers that have a PRB rate below the less active bearer rate as being a first subset of less active bearers, and
classify active bearers that have a PRB rate above the less active bearer rate as being non-less active bearers.

20. The at least one network node of claim 19, wherein the one or more processors classifies the active bearers into very active bearers and less active bearers by being further configured to, perform a second iteration by,
determining a second less active bearer rate by subtracting a summation of physical resource blocks for the first set of less active bearers from the total number of system physical resource blocks and dividing by a number of the non-less active bearers,
classifying active bearers that have a PRB rate below the second less active bearer rate as being a second subset of less active bearers,
the less active bearers being a summation of the first and second subset of less active bearers,
the non-less active bearers being active bearers that are not classified as less active bearers.

21. The at least one network node of claim 20, wherein the one or more processors classifies the active bearers into very active bearers and less active bearers by being further configured to, repeat the performing of the second iteration until a number of the non-less active bearers is 0 or 1, or until an absolute value of a difference between a PRB rate for a most active user and an iteratively determined less active bearer rate is below a threshold,
the most active user being a user with a largest physical resource block rate,
the iteratively determined less active bearer rate being a less active bearer rate for a particular iteration during the repeating of the performing of the second iteration,
determine the very active bearers as being active bearers that are not classified as less active bearers following the repeating of the performing of the second iteration.

22. A first node, comprising:
one or more processors configured to,
receive an average physical resource block rate in the form of cell congestion level information for a cell from a second node, the second node being part of the IP-CAN, wherein the average rate of physical resource blocks is a persistent average rate of physical resource blocks over a first time interval that is based on an instant average rate of physical resource blocks and averages of auxiliary data;
receive average channel condition information for at least one UE served by the cell;
calculate an average bearer throughput for the UE based on the average physical resource block rate and the average channel condition information; and
export the average bearer throughput for the UE.

23. The first node of claim 22, wherein the average channel condition information includes at least one of an average signal to noise ratio (SINR) as reported by a user equipment, an average modulation and coding scheme (MCS) index as reported by a scheduler, and an average transmitted bits sent (TBS) slope index.

24. The first node of claim 22, wherein the one or more processors exports the average bearer throughput by being further configured to,
forward the average bearer throughput for the UE to at least one of the application function and an internet protocol connectivity access network (IP-CAN) function that controls an application data flow.

25. The first node of claim 22, wherein the first node is one of an application function (AF) in internet protocol packet data network (IP-PDN) and an AF at the UE.

26. The first node of claim 22, wherein the first node is in the IP-CAN.

27. The first node of claim 22, wherein the first node is in the IP-CAN.

28. The first node of claim 27, wherein the instant average rate of physical resource blocks is an average rate of physical resource blocks over a second interval that is shorter than the first time interval,
the averages of auxiliary data including at least one of a number of very active bearers and less active bearers, an available aggregate physical resource block rate, a number of physical resource blocks per modulation and coding scheme (MCS) on an aggregate basis or individual bearer basis, a number of retransmission physical resource blocks per MCS on an aggregate basis or individual bearer basis, a number of transmitted bits sent (TBS) on an aggregate basis or individual bearer basis, and guaranteed bit rate (GBR)/maximum bit rate (MBR) settings for GBR bearers.

* * * * *